United States Patent
Pelger et al.

(10) Patent No.: US 10,473,267 B2
(45) Date of Patent: Nov. 12, 2019

(54) METHOD FOR FILLING A FUEL STORAGE SYSTEM OF A MOTOR VEHICLE

(71) Applicant: Bayerische Motoren Werke Aktiengesellschaft, Munich (DE)

(72) Inventors: Andreas Pelger, Ismaning (DE); Klaus Szoucsek, Haimhausen (DE); Klaas Kunze, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 237 days.

(21) Appl. No.: 14/687,397

(22) Filed: Apr. 15, 2015

(65) Prior Publication Data

US 2015/0219279 A1 Aug. 6, 2015

Related U.S. Application Data

(63) Continuation of application No. PCT/EP2013/069500, filed on Sep. 19, 2013.

(30) Foreign Application Priority Data

Oct. 16, 2012 (DE) .......... 10 2012 218 857

(51) Int. Cl.
  *F17C 5/06* (2006.01)
(52) U.S. Cl.
  CPC .......... *F17C 5/06* (2013.01); *F17C 2221/012* (2013.01); *F17C 2223/0115* (2013.01);
  (Continued)
(58) Field of Classification Search
  CPC ...... F17C 5/06; F17C 5/007; F17C 2260/021; F17C 13/084; F17C 2221/012; H01M 8/04; F16L 55/04–055
  (Continued)

(56) References Cited

U.S. PATENT DOCUMENTS 5,615,702 A * 4/1997 Dawans ................ B60K 15/07
                                                 137/255
6,079,459 A * 6/2000 Klotz ..................... F17C 5/002
                                                 141/18
(Continued)

FOREIGN PATENT DOCUMENTS

CN   102340013 A   2/2012
CN   102470750 A   5/2012
(Continued)

OTHER PUBLICATIONS

International Search Report (PCT/ISA/210) dated Feb. 17, 2014 with English translation (seven pages).
(Continued)

*Primary Examiner* — Andrew D StClair
(74) *Attorney, Agent, or Firm* — Crowell & Moring LLP

(57) ABSTRACT

A method is provided for filling a fuel storage system of a motor vehicle with fuel at a relatively high pressure. The fuel storage system has a main tank, which can be filled by way of a main filling line until a limit pressure has been reached, and an auxiliary storage device. If the filling line is connected to a supply station, which provides fuel at a pressure exceeding the tank limit pressure, a tank shut-off valve provided in the filling line will be closed in time before the limit pressure is reached in the main tank and an auxiliary tanking valve is opened in an auxiliary storage device filling line branching off from the main filling line upstream of the tank shut-off valve and leading to the auxiliary storage device. The auxiliary storage device is configured to receive fuel at a higher pressure than the above-mentioned tank limit pressure. The auxiliary storage device is connected downstream of a shutoff valve, which is provided in a supply line leading to a consuming device and which is closed during a filling operation of the main tank, to the supply line such that the consuming device can be operated from the auxiliary storage device even when the shut-off valve is closed.

5 Claims, 1 Drawing Sheet

(52) U.S. Cl.
CPC ......... *F17C 2223/0123* (2013.01); *F17C 2223/036* (2013.01); *F17C 2225/0115* (2013.01); *F17C 2225/0123* (2013.01); *F17C 2225/036* (2013.01); *F17C 2227/04* (2013.01); *F17C 2250/01* (2013.01); *F17C 2250/0626* (2013.01); *F17C 2250/072* (2013.01); *F17C 2260/021* (2013.01); *F17C 2265/065* (2013.01); *Y02E 60/321* (2013.01)

(58) Field of Classification Search
USPC ........................................ 138/31; 137/115.01
See application file for complete search history.

(56) References Cited

U.S. PATENT DOCUMENTS

| | | | | |
|---|---|---|---|---|
| 6,708,718 | B2 * | 3/2004 | Yamada | F16K 1/305 |
| | | | | 137/255 |
| 7,988,926 | B2 * | 8/2011 | Schmidt-Ihn | C01B 3/0005 |
| | | | | 165/104.12 |
| 8,197,988 | B2 * | 6/2012 | Kim | F17C 5/06 |
| | | | | 137/255 |
| 8,714,183 | B2 * | 5/2014 | Mori | B60K 15/04 |
| | | | | 137/256 |
| 9,328,745 | B2 * | 5/2016 | Bartlok | F15B 1/04 |
| 2002/0100518 | A1 * | 8/2002 | Kuriiwa | C01B 3/0005 |
| | | | | 141/4 |
| 2005/0130002 | A1 * | 6/2005 | Kuriiwa | B60L 11/1885 |
| | | | | 429/437 |
| 2009/0250138 | A1 * | 10/2009 | Bavarian | F17C 7/00 |
| | | | | 141/4 |
| 2012/0018033 | A1 * | 1/2012 | Nakazawa | H01M 8/04201 |
| | | | | 141/4 |
| 2012/0115061 | A1 | 5/2012 | Tsubokawa | |
| 2012/0216910 | A1 | 8/2012 | Inagi et al. | |

FOREIGN PATENT DOCUMENTS

| | | | |
|---|---|---|---|
| CN | 102667303 | A | 9/2012 |
| DE | 324662 | C | 9/1920 |
| DE | 337400 | C | 5/1921 |
| DE | 100 21 681 | A1 | 11/2001 |
| DE | 100 21 681 | C2 | 6/2002 |
| DE | 103 30 308 | A1 | 2/2005 |
| DE | 10 2008 053 463 | A1 | 5/2010 |
| DE | 10 2008 060 127 | A1 | 6/2010 |
| EP | 1 800 930 | A1 | 6/2007 |
| JP | 9-229298 | A | 9/1997 |
| JP | 2004-327297 | A | 11/2004 |
| WO | WO 2011138826 | A1 * | 11/2011 ............ B60K 15/04 |

OTHER PUBLICATIONS

German Search Report dated Oct. 1, 2014 with partial English translation (11 pages).

Chinese Office Action issued in corresponding Chinese Application No. 201380053587.6 dated Oct. 10, 2015 with English translation (nine pages).

* cited by examiner ized storage of cryogenic hydrogen in a supercritical state are being developed. For the pressurized storage of gaseous hydrogen (practically at ambient temperature), pressure values in the order of magnitude of from 600 bar to 700 bar are currently provided, at which pressure values gaseous hydrogen is being offered at a gas station or generally at a supply station, whereas a pressure level which is lower in comparison thereto in the order of magnitude of 300 bar is provided for the previously mentioned pressurized cryogenic storage. As state of the art in this respect, reference can also be made to the above-mentioned German Patent Document DE 10 2008 060 127 A1.

METHOD FOR FILLING A FUEL STORAGE SYSTEM OF A MOTOR VEHICLE

CROSS REFERENCE TO RELATED APPLICATIONS

This application is a continuation of PCT International Application No. PCT/EP2013/069500, filed Sep. 19, 2013, which claims priority under 35 U.S.C. § 119 from German Patent Application No. 10 2012 218 857.6, filed Oct. 16, 2012, the entire disclosures of which are herein expressly incorporated by reference.

BACKGROUND AND SUMMARY OF THE INVENTION

The invention relates to a method of filling a fuel storage system of a motor vehicle with fuel at relatively high pressure, wherein the fuel storage system has a main tank, which can be filled by way of a main filling line until a limit pressure has been reached, and having an auxiliary storage device. Preferably, the fuel is hydrogen. With respect to prior art, reference is made to German Patent document DE 100 21 681 C2 and German Patent document DE 10 2008 060 127 A1.

The storage technology for hydrogen in motor vehicles is currently undergoing extensive development, since hydrogen is considered to be a future alternative to fuels which are obtained from mineral (crude) oil for the drive engines of motor vehicles. In addition to the storage of liquid hydrogen in a cryogenic state, the pressurized storage of gaseous hydrogen and, as it were as a combination thereof, the pressurized cryogenic storage of cryogenic hydrogen in a supercritical state are being developed. For the pressurized storage of gaseous hydrogen (practically at ambient temperature), pressure values in the order of magnitude of from 600 bar to 700 bar are currently provided, at which pressure values gaseous hydrogen is being offered at a gas station or generally at a supply station, whereas a pressure level which is lower in comparison thereto in the order of magnitude of 300 bar is provided for the previously mentioned pressurized cryogenic storage. As state of the art in this respect, reference can also be made to the above-mentioned German Patent Document DE 10 2008 060 127 A1.

In German Patent document DE 100 21 681 C2 also mentioned above, an energy storage system for storing, in particular, cryogenic hydrogen is described. In addition to the so-called main tank, the energy storage system has a so-called auxiliary storage device. In this auxiliary storage device, hydrogen is stored which has to be blown off from the main tank, constructed as a cryo-tank, in order to prevent an inadmissibly high pressure buildup in the main tank. Such a pressure buildup is caused by a heating of the hydrogen contained in the main tank as a result of the unavoidable small amount of heat that enters from the environment into the tank.

In contrast to the pure pressure storage, cryo-pressure storage has the advantage that larger amounts of hydrogen (generically referred to herein as a storage medium or fuel) can be stored at a lower pressure, which has a favorable effect particularly on the weight of the main tank (and therefore also the weight of a motor vehicle equipped therewith). In contrast to the pure pressure-storage, cryo-pressure storage has the advantage of a significantly lower blow-off amount resulting from the unavoidable heat entry. Advantageously, a motor vehicle equipped with a cryo-pressure tank as its main tank can be filled up not only with cryogenic hydrogen in the supercritical state but, in cases in which no cryogenic hydrogen is available, gaseous hydrogen can also fill the main tank.

However, in the filling of a main tank, which, as with the technology developed to date for cryo-pressure tanks, can be filled only up to a certain limit pressure (currently, for example, in the order of 300 bar), care must be taken when this filling takes place at a service station or the like (generically referred to herein as a supply station) offering gaseous hydrogen at a comparatively higher pressure level of, for example, 600 bar, so that no pressure arises in the main tank that exceeds the above-mentioned limit pressure. This can basically be relatively easily ensured in that, in a filling line provided in the motor vehicle and leading to the main tank, whose end situated opposite the main tank is connected with the service station or the like providing the gaseous hydrogen (at such a high pressure level), a so-called tank shut-off valve is provided. This tank shut-off valve, preferably controlled by an electronic control unit, will be closed as soon as a pressure close to the limit pressure is determined in the main tank by way of a pressure measuring sensor.

However, the relatively abrupt closing of such a tank shut-off valve far below the maximal pressure level provided by the service station or supply station may cause pressure surges in the fuel supply system or filling system of the service station or supply station, and thus damage the same.

It is an object of the present invention to provide a method for filling a fuel storage system that avoids the above problems.

For a method according to the invention, this object can be achieved in that, at least if the filling line is connected to a supply station, which provides fuel at a pressure exceeding the tank limit pressure, a tank shut-off valve provided in the filling line will be closed in time before the limit pressure is reached in the main tank. An auxiliary storage device filling line branches off from the filling line upstream of the tank shut-off valve and leads to an auxiliary storage device designed for receiving fuel at a higher pressure than the above-mentioned tank limit pressure. A so-called auxiliary tank valve 10 may optionally be provided in the auxiliary storage device filling line 11 to be opened essentially simultaneously with or shortly before closing of the tank shut-off valve.

According to the invention, the pressure buildup in the main tank is monitored by an electronic control unit during a filling operation of the main tank. This is done preferably by use of an appropriately placed pressure sensor. If a further filling of the main tank could result in the risk of exceeding its limit pressure, then a further filling will be prevented by closing a suitable valve, in this case, a tank shut-off valve. An auxiliary storage device is connected with the filling line upstream of this tank shut-off valve, so that the fuel supplied by the service/supply station will be delivered into the auxiliary storage device. Essentially simultaneously with the closing of the tank shut-off valve, but for safety reasons shortly before, an auxiliary tank valve that may be provided in the filling line is opened. The auxiliary storage device is designed to withstand the maximal pressure level, which is usually offered by service stations for, in this case, gaseous hydrogen. A value in the order of from 600 bar to 700 bar is mentioned above as an example or as a current numerical value of this maximal pressure level. In the auxiliary storage device, which preferably has a relatively low storage volume, a pressure, which approaches the maximal pressure (of from 600-700 bar) offered by the service station, will then build up in a relatively short term manner but still so slowly that the filling system of the service station can react to it in the usual fashion. Electronically controlled in the service station or by its filling system, a soft switching off of the filling operation will then be initiated analogously to the filling of other pressure tanks of other vehicles which are designed for receiving gaseous hydrogen at such a high pressure level.

Although it is required for the implementation of the method according to the invention that, in addition to the main tank, which preferably is a cryo-pressure tank (compare the above-mentioned German Patent document DE 10 2008 060 127 A1), the motor vehicle is equipped with an auxiliary storage device, which can withstand the pressure level maximally offered at hydrogen service stations. However, such an auxiliary storage device can be kept relatively small. Since, as explained above, only a small storage volume is required, such a small auxiliary storage device will only slightly increase the weight of a motor vehicle equipped with it. Advantageously, such an auxiliary storage device can take over additional functions, as, for example, (as basically known from the above-mentioned German Patent Document DE 100 21 681 C2) intermediately storing, for later use or combustion by a consuming device, a partial amount of hydrogen which, even in the case of a cryo-pressure tank, may have to be blown off or removed for avoiding an inadmissibly high pressure rise in the tank.

A further advantageous additional function of the auxiliary storage device may consist of permitting the operation or continued operation of a consuming device of the fuel stored essentially in the main tank also during a filling operation of this main tank. It may specifically be recommendable for various reasons to shut off, during a filling operation of the main tank, a so-called supply line, by way of which the consuming device provided in the motor vehicle—preferably a fuel cell or an internal-combustion engine—is supplied with fuel from the main tank. It is now suggested to connect the auxiliary storage device downstream of a shutoff valve, which is provided in a supply line leading to a consuming device and which is closed during a filling operation of the main tank, to the above-mentioned supply line or by opening a corresponding valve such that the consuming device can be operated from the auxiliary storage device even when the shut-off valve is closed. This is particularly advantageous when the consuming device is a fuel cell system because its shut-down and subsequent restart would require excessive expenditures relative to only a filling operation of the main tank.

It is further suggested to ensure, by an appropriate removal of fuel from the auxiliary storage device, that the latter will be at least approximately emptied in time before the conclusion of a filling operation of the main tank. This is advantageous because the auxiliary storage device can thereby be utilized as an additional storage volume for fuel with a maximally achievable capacity. Although at first no further fuel/hydrogen possibly blown off from the main tank for preventing an inadmissible pressure rise can be introduced into the auxiliary storage device, this consequence can easily be diminished in that, subsequent to a filling operation of the main tank, the consuming device is at first supplied solely from the auxiliary storage device, specifically preferably until the pressure in the auxiliary storage device has dropped to at least the limit pressure level of the main tank.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
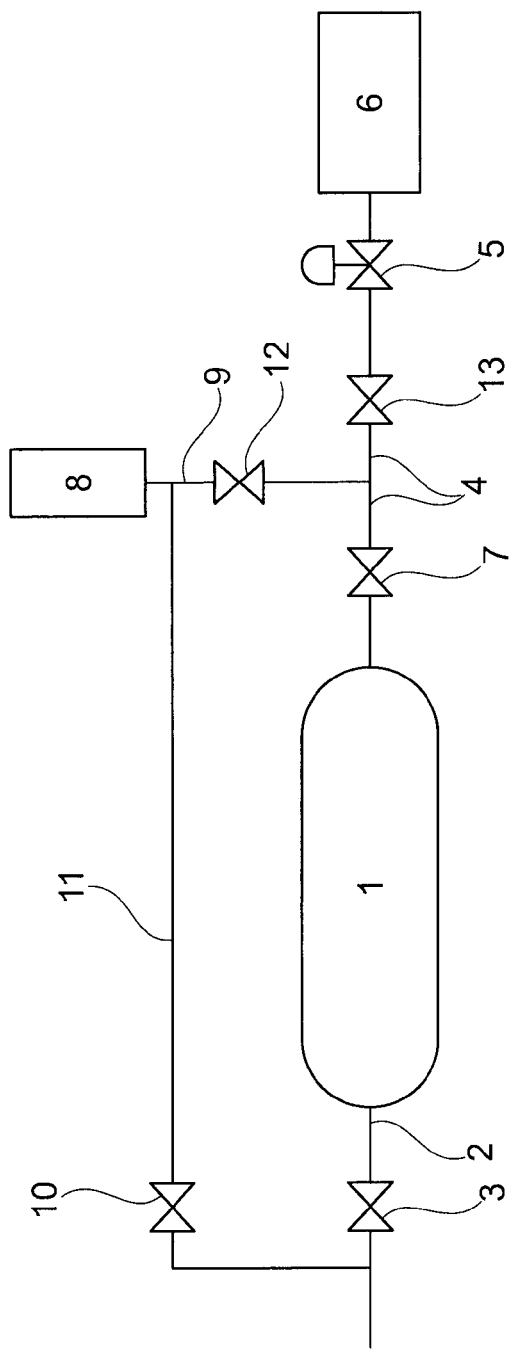
FIG. 1 is a schematic diagram illustrating a fuel storage system of a motor vehicle on which an exemplary method according to the invention can be implemented.

Referring to FIG. 1, reference number 1 identifies a main tank constructed as a cryo-pressure tank for the storage of hydrogen in the cryogenic supercritical state at pressure values of up to 300 bar (=limit pressure of the main tank). By way of a filling line 2, in which a tank shut-off valve 3 is provided, this main tank 1 can be filled at a service station (supply station) with cryogenic hydrogen in the supercritical state or with gaseous hydrogen at a high pressure. From the main tank 1, a supply line 4, in which a pressure control valve 5 is provided, leads to a consuming device 6, particularly in the form of a fuel cell. The pressure control valve 5 lowers the hydrogen pressure prevailing in the main tank 1 to a level acceptable for the consuming device 6. Close to the main tank 1, a shut-off valve 7 is provided in the supply line 4, which shut-off valve 7 is closed when the main tank 1 is being filled at a service station.

In addition to the main tank 1, an auxiliary storage device 8 is provided for storing fuel or hydrogen, which is connected by way of a feed line 9 with the supply line 4 downstream of the shut-off valve 7, i.e. on its side facing the consuming device 6 and upstream of the pressure control valve 5. In addition, the auxiliary storage device 8 can be connected by way of an auxiliary storage device filling line 11 with the filling line 2, wherein a so-called auxiliary tank valve 10 optionally provided in the auxiliary storage device filling line 11 is opened.

The respective technical background, specifically the prevention of a pressure surge occurring during a filling operation of the main tank 1 upstream of the tank shut-off valve 3 with the shutting of the tank shut-off valve 3, and reaching the service station or its filling system, was explained above. Accordingly, during filling of the main tank 1 at a service station, which exclusively provides gaseous hydrogen below a pressure level of, for example, 700 bar, the pressure in the main tank 1 is continuously monitored by way of a pressure sensor (not shown). For example, when the pressure amounts to 285 bar and is therefore slightly below the above-mentioned tank limit pressure, if an auxiliary tank valve 10 is provided, the at first closed auxiliary tank valve 10 will be opened. As soon as the pressure in the main tank 1 has risen to 295 bar with the further flowing-in of hydrogen from the service station, the tank shut-off valve 3 will be closed, after which, on the part of the service station, hydrogen will be conveyed into the filling line 2 and the auxiliary storage device filling line 11 and, by way of the open auxiliary tank valve 10, into the auxiliary storage device until the maximal pressure of, for example, 700 bar prevails therein that is provided by the service station.

In the feed line 9 between the auxiliary storage device 8 and the supply line 4, a valve 12 is provided. In the opened condition, the valve 12 makes it possible that, while the shut-off valve 7 is closed, the consuming device 6 is supplied with fuel from the auxiliary storage device and can therefore be operated when a further valve 13 provided in the supply line 4 (here, upstream of the pressure control valve 5 and downstream of the junction of the feeding line 9) is opened. The function of valve 12 will be discussed in the following. After a complete filling of the main tank 1, the shut-off valve 7 will preferably be kept closed and therefore the consuming device 6 will be supplied from the auxiliary storage device 8 until the pressure in the auxiliary storage device 8 has dropped at least to the limit pressure of the main tank 1, whereby it is ensured that, during a later filling operation of the main tank 1, the auxiliary storage device 8 can carry out its above described essential function, specifically the preventing of a pressure surge that reaches the service station.

In contrast, while the consuming device 6 is not operated (and particularly when the motor vehicle is parked), when the valve 13 and, naturally, also the valves 10 and 3, are closed and the valves 7 and 12 are being opened or are open, a pressure buildup in the main tank 1 can be reduced without loss of stored fuel in that fuel discharged from the main tank 1 for reasons of safety by way of the then opened shut-off valve 7 arrives in the auxiliary storage device 8 through the feed line 9 and is intermediately stored there until the consuming device 6 is supplied with fuel from the auxiliary storage device 8. Such a pressure buildup in the main tank may result, in particular, from heat entry into the main tank while the motor vehicle is parked. Such a pressure buildup could cause the limit pressure of the main tank to be exceeded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of filling a fuel storage system of a motor vehicle with fuel, the fuel storage system having a main tank fillable via a main filling line until a limit pressure of the main tank is reached, and an auxiliary storage device having a limit pressure higher than the main tank limit pressure, the main tank having a larger storage capacity than the auxiliary storage device, the method comprising the acts of:

when the main filling line is connected to a supply station providing fuel at a pressure exceeding the limit pressure of the main tank, closing a main tank inlet shut-off valve arranged in the main filling line upstream of the main tank before the limit pressure of the main tank is reached; and after closing the main tank inlet shut-off valve prior to reaching the main tank limit pressure, receiving fuel in the auxiliary storage device at a higher pressure than the limit pressure of the main tank via an auxiliary storage device filling line between the auxiliary storage device and the main filling line upstream of the main tank inlet shut-off valve.

2. The method according to claim 1, wherein a main tank outlet shut-off valve is provided in a supply line from the main tank to a consuming device, the method further comprising the acts of:

maintaining the main tank outlet shut-off valve in a closed state during a filling operation of the main tank; and connecting the auxiliary storage device to the consuming device such that the consuming device is operable with fuel from the auxiliary storage device when the main tank outlet shut off valve in the supply line is closed.

3. The method according to claim 2, further comprising the act of:

removing fuel from the auxiliary storage device before a conclusion of the filling operation of the main tank in order to at least partially empty the auxiliary storage device before the conclusion of the filling operation of the main tank.

4. The method according to claim 1, further comprising the act of:

removing fuel from the auxiliary storage device before a conclusion of the filling operation of the main tank in order to at least partially empty the auxiliary storage device before the conclusion of the filling operation of the main tank.

5. The method according to claim 1, wherein the act of receiving fuel in the auxiliary storage device includes opening an auxiliary tank valve in the auxiliary storage device filling line in order for fuel to flow into the auxiliary storage device.

* * * * *